(12) United States Patent
Kanazawa (10) Patent No.: US 12,474,309 B2
(45) Date of Patent: Nov. 18, 2025

(54) WAVEFORM ANALYTICAL METHOD AND WAVEFORM ANALYTICAL DEVICE

(71) Applicant: SHIMADZU CORPORATION

(72) Inventor: Shinji Kanazawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 442 days.

(21) Appl. No.: 17/761,140

(22) PCT Filed: Oct. 2, 2019

(86) PCT No.: PCT/JP2019/039018
§ 371 (c)(1),
(2) Date: Mar. 16, 2022

(87) PCT Pub. No.: WO2021/064924
PCT Pub. Date: Apr. 8, 2021

(65) Prior Publication Data
US 2022/0373522 A1 Nov. 24, 2022

(51) Int. Cl.
*G01N 30/86* (2006.01)
(52) U.S. Cl.
CPC ..... *G01N 30/8634* (2013.01); *G01N 30/8637* (2013.01); *G01N 30/8641* (2013.01)
(58) Field of Classification Search
CPC .......... G01N 30/8634; G01N 30/8637; G01N 30/8641; G01N 30/8631; G01N 30/86;
(Continued)

(56) References Cited

U.S. PATENT DOCUMENTS 5,436,166 A * 7/1995 Ito ...................... G01N 35/1097
95/82
2002/0147548 A1* 10/2002 Walther ............. G01N 30/8624
702/20

(Continued)

FOREIGN PATENT DOCUMENTS

JP 2000-206103 A 7/2000
JP 20098582 A 1/2019

(Continued)

OTHER PUBLICATIONS

Second Office Action dated May 9, 2023 for the corresponding Japanese Patent Application No. 2021-550866.
(Continued)

*Primary Examiner* — Mohamed Charioui
(74) *Attorney, Agent, or Firm* — Muir Patent Law, PLLC (57) ABSTRACT

A waveform analytical device 4 which analyzes a target waveform which is a chromatogram or an optical spectrum includes a waveform division unit 54 configured to divide the target waveform into a plurality of partial waveforms, a determination unit 55 configured to determine whether each of the plurality of partial waveforms of the target waveform is a peak portion using a learned model created by machine learning using a plurality of sets of a plurality of partial waveforms created by dividing a reference waveform having a peak portion whose position is known, and a classification unit 56 configured to classify the target waveform into a peak region where the peak portion continues and a non-peak region other than the peak region based on a determination result from the determination unit.

16 Claims, 7 Drawing Sheets

(58) Field of Classification Search
CPC .......... G01N 30/02; G01N 3/00; G01N 21/64; G01N 21/63; G01N 21/62; G01N 21/00; G01N 23/2273; G01N 23/227; G01N 23/22; G01N 23/00; G01N 27/62; G01N 27/00; G01N 30/8682; G01N 30/8675; H01J 49/26; H01J 49/00

See application file for complete search history.

(56) References Cited

U.S. PATENT DOCUMENTS

| | | | |
|---|---|---|---|
| 2013/0311109 A1* | 11/2013 | Yao | H01J 49/0036 |
| | | | 702/23 |
| 2014/0032451 A1* | 1/2014 | Ben-Hur | G06V 10/761 |
| | | | 706/12 |
| 2016/0224830 A1* | 8/2016 | Noda | G01N 30/8634 |
| 2016/0238576 A1* | 8/2016 | Kozawa | G01N 30/8641 |
| 2016/0252484 A1* | 9/2016 | Rubinstein | G01N 30/8637 |
| | | | 702/19 |
| 2017/0336370 A1* | 11/2017 | Noda | G01N 30/8675 |
| 2018/0349320 A1* | 12/2018 | Yamaguchi | G06N 20/00 |
| 2019/0064130 A1 | 2/2019 | Kanazawa et al. | |
| 2020/0279408 A1 | 9/2020 | Osoekawa et al. | |
| 2020/0372973 A1* | 11/2020 | Serie | G16B 5/00 |
| 2021/0248417 A1* | 8/2021 | Taya | G06F 18/214 |

FOREIGN PATENT DOCUMENTS

| | | | |
|---|---|---|---|
| WO | 2017094170 A1 | 6/2017 | |
| WO | 2019092836 A1 | 5/2019 | |

OTHER PUBLICATIONS

"Deep learning technology", Wave May 2017 vol. 21., (2017), submitted with a machine translation.

Ronneberger et al., "U-Net: Convolutional Networks for Biomedical Image Segmentation", [online], [Submitted on May 18, 2015], arXiv.org, <URL: https://arxiv.org/pdf/1505.04597.pdf>.

Written Opinion of the International Searching Authority (ISA237) for PCT application PCT/JP2019/039018, dated Dec. 24, 2019.

Notice of Allowance dated Jul. 18, 2023 issued for the corresponding Japanese Patent Application No. 2021-550866.

First Office Action dated Mar. 29, 2024 issued for the corresponding Chinese Patent Application No. 201980100270.0.

First Office Action dated Nov. 8, 2022 for corresponding Japanese Patent Application No. 2021-550866.

Second Office Action dated Oct. 1, 2024 issued for the corresponding Japanese Divisional Patent Application No. 2023-130412.

Second Office Action dated Nov. 29, 2024 issued for the corresponding Chinese Patent Application No. 201980100270.0.

First Office Action dated Jul. 30, 2024 issued for the corresponding Japanese Divisional Patent Application No. 2023-130412.

"Streamline (More Efficient) Analysis Work with Intelligent Waveform Processing Algorithm", [2022], Shimadzu Corporation.

Third Office Action dated Mar. 31, 2025 issued for the corresponding Chinese Patent Application No. 201980100270.0.

* cited by examiner

WAVEFORM ANALYTICAL METHOD AND WAVEFORM ANALYTICAL DEVICE

TECHNICAL FIELD

The present invention relates to a technology for analyzing a waveform of a chromatogram or an optical spectrum.

BACKGROUND ART

A chromatograph is used to identify and quantify components in a sample. In the chromatograph, the components in the sample are separated by a column, and components flowing out from the column are sequentially detected. Afterwards, a chromatogram with the horizontal axis as time and the vertical axis as detection intensity is created. From the area and height of a peak of the chromatogram, the concentration and content of a compound corresponding to the peak are obtained.

Obtaining the area and height of the peak from the chromatogram requires specifying a start point and an end point of the peak rising from a baseline of the chromatogram. Specifying a start point and an end point of a peak of a chromatogram is referred to as peak picking. The baseline and a peak of the chromatogram often include noise. Therefore, it is necessary to specify the start point and the end point of the peak appropriately in consideration of such noise. There are various peak picking algorithms in consideration of such noise. For example, Patent Literature 1 describes a technology for performing peak picking with filtering processing using a filter having a bandwidth or a shielding frequency depending on the degree of temporal change in chromatogram data, or the like. Some software programs for chromatogram analysis are capable of executing several algorithms, and allow a user to choose an algorithm, set necessary parameters, and perform peak picking (for example, Non Patent Literature 1).

CITATION LIST

Patent Literature

Patent Literature 1: JP 2009-8582 A

Non Patent Literature

Non Patent Literature 1: "More Efficient Analysis Work with Intelligent Waveform Processing Algorithm", [online], [Accessed on Aug. 16, 2019], Shimadzu Corporation, Non Patent Literature 2: Olaf Ronneberger and two other authors, "U-Net: Convolutional Networks for Biomedical Image Segmentation", [online], [Submitted on 18 May 2015].

SUMMARY OF INVENTION

Technical Problem

The shapes of a peak and a baseline and the appearances of noise of a chromatogram vary depending on types of a sample and a detector. Hence, there is a problem that the operator must choose an algorithm and parameters suitable for a subject sample and the detector used for the chromatogram every time peak picking is performed, which is complicated and laborious. There is another problem that the operator is likely to subjectively set the parameters, and peak picking cannot necessarily be performed with high accuracy.

Here is described a case of performing peak picking on a chromatogram obtained by a chromatograph for separating and measuring components in a sample. The same problems as described above also occur in a case of performing peak picking on an optical spectrum obtained by a spectral measurement device for measuring components in a sample.

An object of the present invention is to provide a technology capable of performing peak picking with high accuracy without complicated operations.

Solution to Problem

One aspect of the present invention made to solve the above problems is a waveform analytical method for analyzing a target waveform which is a chromatogram or an optical spectrum, the waveform analytical method including steps of:

creating, by machine learning using a plurality of sets of a plurality of partial waveforms created by dividing a reference waveform having a peak portion whose position is known, a learned model which specifies a peak portion included in an input waveform;

dividing the target waveform into a plurality of partial waveforms;

determining whether each of the plurality of partial waveforms of the target waveform is a peak portion using the learned model; and classifying the target waveform into a peak region where the peak portion continues and a non-peak region other than the peak region based on a result of the determining.

Another aspect of the present invention made to solve the above problems is a waveform analytical device that analyzes a target waveform which is a chromatogram or an optical spectrum, the waveform analytical device including:

a waveform division unit configured to divide the target waveform into a plurality of partial waveforms;

a determination unit configured to determine whether each of the plurality of partial waveforms of the target waveform is a peak portion using a learned model created by machine learning using a plurality of sets of a plurality of partial waveforms created by dividing a reference waveform having a peak portion whose position is known; and a classification unit configured to classify the target waveform into a peak region where the peak portion continues and a non-peak region other than the peak region based on a determination result from the determination unit.

Advantageous Effects of Invention

In the waveform analytical method and the waveform analytical device according to the present invention, a learned model for determining whether an input waveform is a peak portion is created in advance by machine learning using a plurality of sets of a plurality of partial waveforms created by dividing a reference waveform having a peak portion whose position is known. Here, the reference waveform used to create the learned model is typically a waveform obtained by the same type of measurement as the target waveform (chromatogram or optical spectrum), but a waveform created by theoretical calculation or the like is also available. The plurality of partial waveforms of the reference waveform are created by dividing the reference waveform at intervals narrower than the peak width of a peak included in the reference waveform. In this way, the learned model is created in which various shapes of the partial waveforms constituting a part of the peak are learned. Afterwards, as in the case of dividing the reference waveform, the target waveform is divided at intervals narrower than the peak width of a peak expected to be included in the target waveform to create partial waveforms. Then, the above-described learned model is used to determine whether each of the plurality of partial waveforms obtained by dividing the target waveform is a peak portion whose position is unknown in the target waveform. This results in classifying the plurality of partial waveforms of the target waveform into the peak portion and a non-peak portion. Based on the classification, a region where the peak portion continues is classified as a peak region, and a region where the non-peak portion continues is classified as a non-peak region. In the waveform analytical method and the waveform analytical device according to the present invention, the target waveform is classified into the peak region and the non-peak region by using the learned model in which features of a plurality of reference waveforms are learned, allowing for performing peak picking with high accuracy without complicated operations.

DESCRIPTION OF EMBODIMENTS

Hereinafter, an embodiment of a waveform analytical device and a waveform analytical method according to the present invention will be described with reference to the drawings. The waveform analytical device of the present embodiment is incorporated as a part of a chromatograph mass spectrometry system. The waveform analytical device of the present embodiment is not necessarily required to be integrated with a chromatograph mass spectrometer, and can be configured separately from the chromatograph mass spectrometer.

Figure 1:
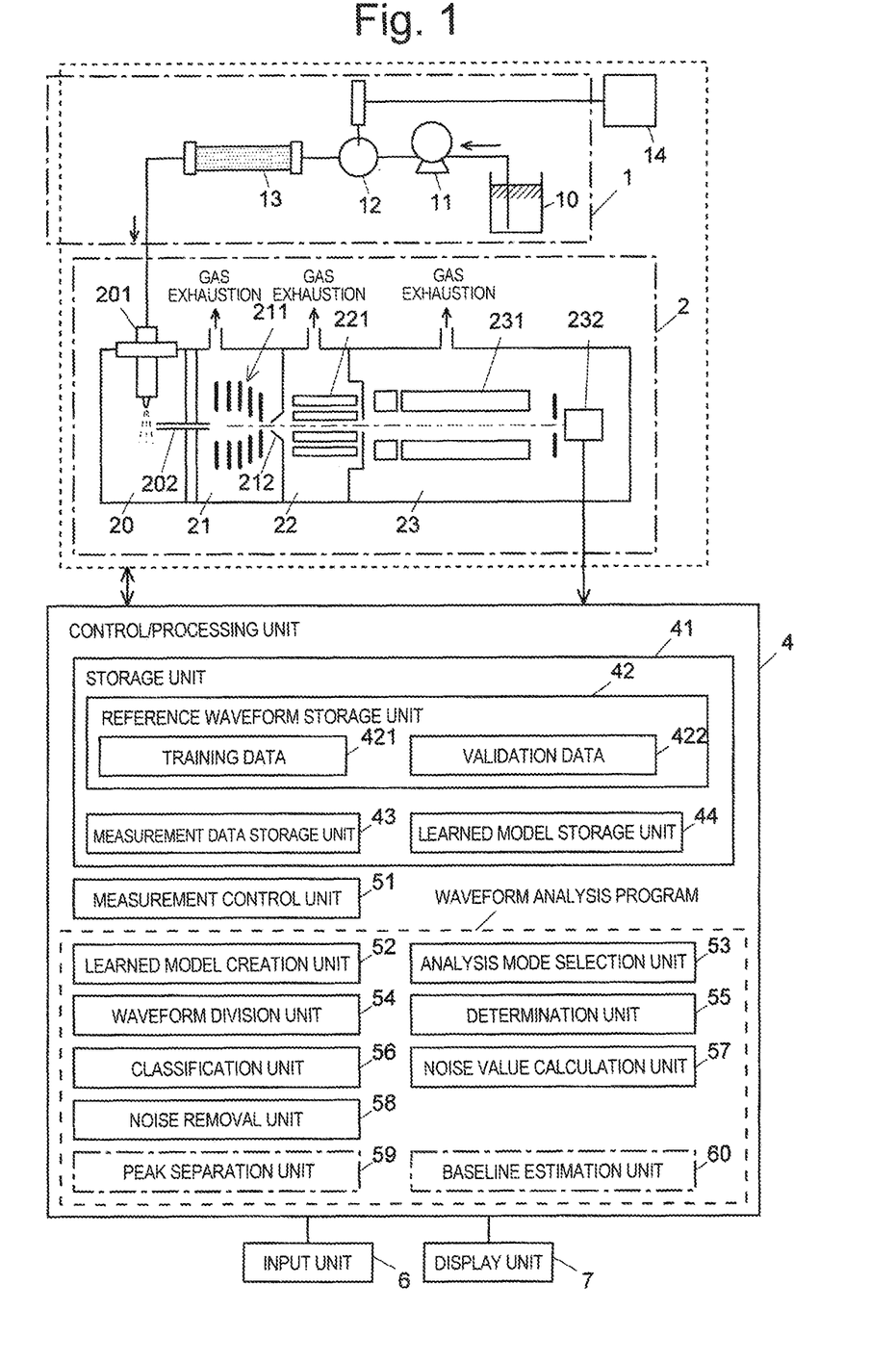
FIG. 1 is a configuration diagram of a main part of a liquid chromatograph mass spectrometry system including an embodiment of a waveform analytical device according to the present invention.

FIG. 1 shows a configuration of a main part of the liquid chromatograph mass spectrometry system of the present embodiment. The liquid chromatograph mass spectrometer of the present embodiment roughly includes a liquid chromatograph 1, a mass spectrometer 2, and a control/processing unit 4 that controls operations of the liquid chromatograph and the mass spectrometer. The liquid chromatograph 1 includes a mobile-phase container 10 in which a mobile phase is reserved, a pump 11 that sucks the mobile phase and delivers the mobile phase at a constant flow rate (or flow velocity), an injector 12 that injects a predetermined amount of sample solution into the mobile phase, and a column 13 that temporally separates components contained in the sample solution. The sample solution flowing out of the column 13 is introduced into an electrospray ionization probe 201 of the mass spectrometer 2. The liquid chromatograph 1 is connected to an autosampler 14 that introduces a plurality of liquid samples one by one into the injector 12.

The mass spectrometer 2 has a configuration of a multi-stage differential exhaust system including a first intermediate vacuum chamber 21 and a second intermediate vacuum chamber 22 in which degrees of vacuum increase stepwisely between an ionization chamber 20 at substantially an atmospheric pressure and a high-vacuum analysis chamber 23 evacuated by a vacuum pump (not illustrated). The electrospray ionization probe (ESI probe) 201 that nebulizes the sample solution supplied from the liquid chromatograph 1 while applying charges to the sample solution is installed in the ionization chamber 20. The ionization chamber 20 and the first intermediate vacuum chamber 21 are communicatively connected with each other via a heated capillary 202 having a small diameter. The first intermediate vacuum chamber 21 and the second intermediate vacuum chamber 22 are separated by a skimmer 212 having a small hole at a top portion, and respectively include ion guides 211 and 221 installed for transporting ions to the subsequent stage while converging the ions. In the analysis chamber 23, a quadrupole mass filter 231 and an ion detector 232 are installed.

The mass spectrometer 2 can perform selected ion monitoring (SIM) measurement and MS scan measurement. In the SIM measurement, the mass-to-charge ratio of ions passing through the quadrupole mass filter 231 is fixed to detect only ions having the mass-to-charge ratio. In the MS scan measurement, ions in a predetermined mass-to-charge ratio range are detected for each mass-to-charge ratio while the mass-to-charge ratio of ions passing through the quadrupole mass filter 231 is scanned in the predetermined mass-to-charge ratio range.

The control/processing unit 4 has a storage unit 41 and, as functional blocks, a measurement control unit 51, a learned model creation unit 52, an analysis mode selection unit 53, a waveform division unit 54, a determination unit 55, a classification unit 56, a noise value calculation unit 57, a noise removal unit 58, a peak separation unit 59, and a baseline estimation unit 60. The storage unit 41 is provided with a reference waveform storage unit 42, a measurement data storage unit 43, and a learned model storage unit 44. The control/processing unit 4 is actually a personal computer, to which an input unit 6 and a display unit 7 are connected. The control/processing unit 4 has a waveform analysis program installed in advance. Executing this waveform analysis program results in implementation of the functions of the learned model creation unit 52, the analysis mode selection unit 53, the waveform division unit 54, the determination unit 55, the classification unit 56, the noise value calculation unit 57, the noise removal unit 58, the peak separation unit 59, and the baseline estimation unit 60.

The reference waveform storage unit 42 stores training data 421 and validation data 422. Both the training data 421 and the validation data 422 are data of waveforms (original waveforms) of chromatograms obtained by the chromatograph mass spectrometer measuring a sample containing various components (for example, in a case where components separated by the liquid chromatograph 1 are subjected to the MS scan measurement with the mass spectrometer 2, a total ion chromatogram representing temporal changes in the total intensity of ions of all detected mass-to-charge ratios, or, in a case where the components are subjected to the SIM measurement or MRM measurement, a mass chromatogram representing temporal changes in the intensity of ions having a specific mass-to-charge ratio). A position of a peak is specified in advance by peak picking. Such original waveform data is normalized in advance so as to have an intensity value within a predetermined range (for example, ±1.0). The normalization that unifies different intensity scales of a plurality of chromatograms into a common intensity scale allows for improving the accuracy of a learned model to be described later. As the training data 421 and the validation data 422, chromatograms obtained by measuring actual samples are used herein, but chromatograms created by simulation may be used.

An original waveform of a chromatogram is divided into a predetermined number of partial original waveforms in the time axis direction. This predetermined number, which is, for example, 1,024 or 512, is determined at least such that the width (length in the time axis direction) of each partial original waveform is smaller than a peak width. For example, the predetermined number is determined based on the magnitude of the peak width and the number of data points required to constitute one peak. As a specific example, a case where the minimum peak width is 0.2 min and the maximum peak width is 2.0 min in a chromatogram obtained by actual measurement will be described. An analysis condition and a state (degree of deterioration) of a column used for component separation may differ between the time of acquiring the measurement data and the time of acquiring data to be analyzed. Thus, in consideration of such differences, the predetermined number is set to be adaptable even when the minimum peak width decreases to 0.1 min and the maximum peak width increases to 3.0 min. In consideration of reproducibility of a peak shape and the like, at least 20 points, more preferably 30 points are required to be included in one peak. Based on the above description, the chromatogram is delimited within a range of 3.0 min and, in order to divide the original waveform such that a range of 0.1 min as the assumed minimum peak width includes 30 points, the predetermined number is required to be set to 900 or more. In the analysis example to be described later, a chromatogram was delimited within a time range of 5.0 min so as to be adaptable even when a peak width is wider than the above assumption, and the predetermined number was set to 1,024 based on a calculation 5.0 min/0.1 min×20 points=1,000 (≈1,024) points.

Data of each partial waveform is associated with information (feature information) regarding a feature of the partial waveform. The feature information associated with a partial original waveform includes at least information on whether the partial waveform belongs to a peak region or a non-peak region. The other feature information will be described later.

The measurement data storage unit 43 stores various measurement conditions used for measuring a sample in the chromatograph mass spectrometer. The measurement data storage unit 43 also stores chromatogram data obtained by measuring the sample. The learned model storage unit 44 stores learned models for performing peak picking on a chromatogram. The learned models stored in the learned model storage unit 44 correspond to respective analysis modes to be described later.

Next, the method for analyzing a chromatogram waveform in the chromatograph mass spectrometry system of the present embodiment will be described. In the chromatograph mass spectrometry system of the present embodiment, executing the waveform analysis program allows for choosing either creation of a learned model or analysis of chromatogram data.

Figure 2:
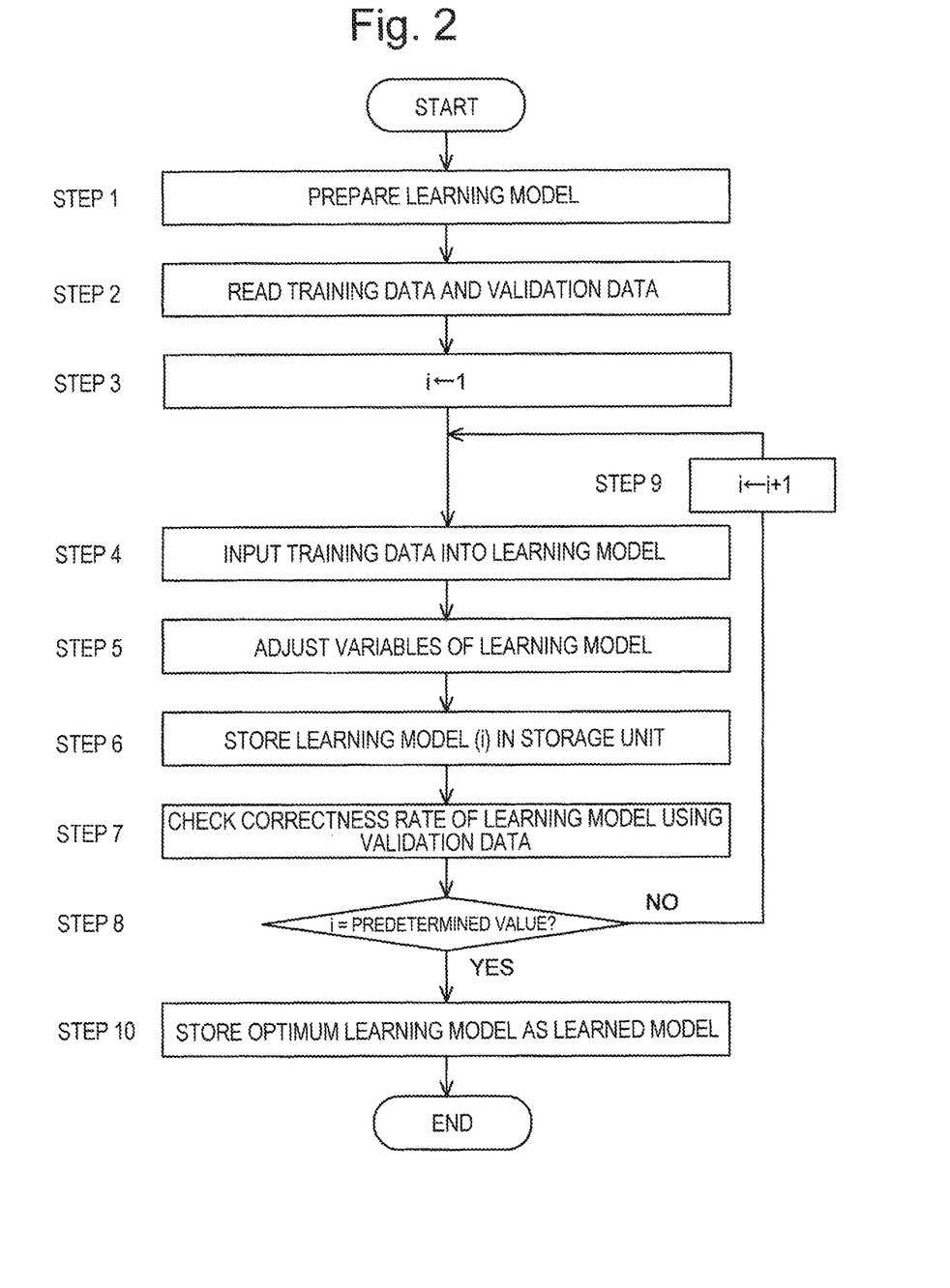
FIG. 2 is a flowchart illustrating a procedure of creating a learned model in an embodiment of a waveform analytical method according to the present invention.

First, a procedure of creating a learned model will be described with reference to a flowchart of FIG. 2.

When a user chooses the creation of a learned model, the learned model creation unit 52 prepares an untrained learning model (step 1). As this learning model, various models capable of executing semantic segmentation can be used. Semantic segmentation is generally used to analyze an image including pixel data distributed two-dimensionally. However, in the present embodiment, semantic segmentation is applied to analyzing a waveform of a chromatogram including data arranged one-dimensionally along the time axis. As a learning model capable of executing semantic segmentation, for example, U-Net (see Non Patent Literature 2), SeGNet, PSPNet, or the like can be used. The present embodiment employs the U-Net.

Subsequently, the training data 421 and the validation data 422 are read from the reference waveform storage unit 42 (step 2). Next, the learned model creation unit 52 sets the number of times of learning (epochs) i to 1 (step 3), and inputs the training data 421 into the learning model (step 4). Variables of the learning model are adjusted based on the partial original waveforms of the training data 421 and the feature information associated with the partial original waveforms (step 5). In the U-Net used as the learning model in the present embodiment, weights are adjusted in a neural network so that correct feature information can be obtained from the partial original waveforms. Upon completion of the input of the training data 421 and the adjustment of the variables of the learning model, a learning model (i) at the end of the i-th learning is stored in the storage unit 41 (step 6), where the number of times of learning (epochs) i=1. In addition, the validation data 422 is input into the learning model (i), and a correctness rate of feature information added by analyzing the partial original waveforms of the validation data 422 with the learning model (i) is checked (step 7).

After the check of the correctness rate for the partial waveforms of the validation data 422, it is determined whether i has reached a predetermined value (for example, 100) (step 8). Since i=1 at this time, it is determined that i has not reached the predetermined value (NO in step 8), i is incremented by one (i←i+1) (step 9), and the processing returns to step 4. After returning to step 4, the same processing as described above is repeated until i reaches the predetermined value. When i reaches the predetermined value (YES in step 8), an appropriate learning model is selected from among a plurality of learning models stored in the storage unit 41, the selected learning model (i) is stored in the learned model storage unit 44 as a learned model (step 10), and the sequential processing ends. The selection of the learned model is based on, for example, the highest correctness rate for the validation date, the absence of over-training, and the like. The predetermined value is set to a value larger than the number of times allowing for constructing an appropriate learned model. Such a value can be determined, for example, by referring to an example of past construction of a learned model or by preliminarily constructing a learned model. In the above example, the learning model (i) is stored in the storage unit 41 at every time of learning, but may be stored for each predetermined number of times.

Figure 3:
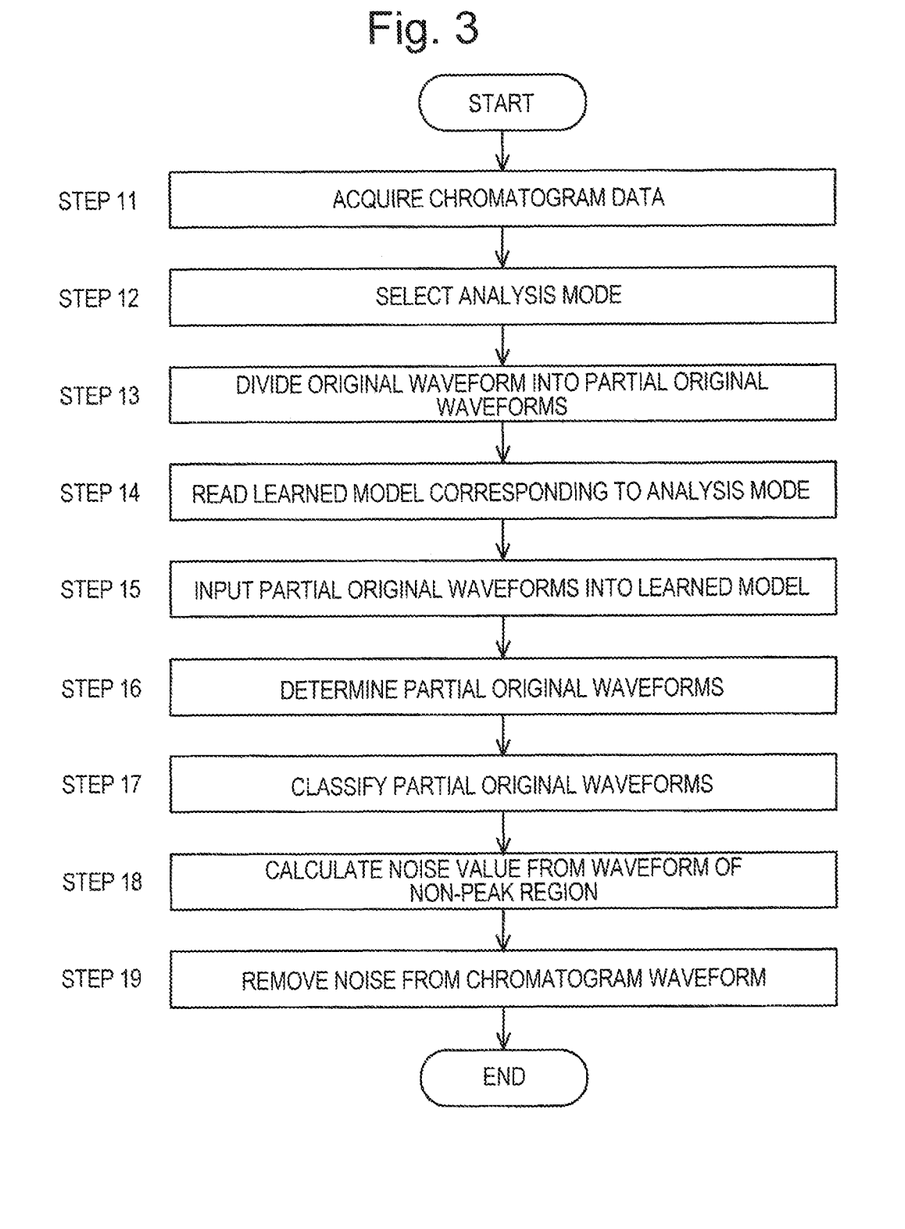
FIG. 3 is a flowchart illustrating a procedure of analyzing a chromatogram in the waveform analytical method of the present embodiment.

Next, a procedure of analyzing a waveform of an unanalyzed chromatogram will be described with reference to a flowchart of FIG. 3.

When the user sets a sample in the autosampler 14 and gives a measurement start instruction, the measurement control unit 51 reads the measurement conditions stored in the measurement data storage unit 43 and displays the read measurement conditions on a screen of the display unit 7. When the user selects a measurement condition to be used from the displayed measurement conditions (and appropriately changes the measurement condition) for the measurement start instruction, the measurement control unit 51 performs chromatograph mass spectrometry on the sample to acquire a chromatogram. A measurement operation by the measurement control unit 51 is the same as that in the related art, and thus will not be described in detail. Here is described an example in which the chromatogram is acquired by measuring the sample with the measurement control unit 51, but chromatogram data may be acquired by reading the chromatogram data acquired in advance.

After the chromatogram data is acquired by measuring the sample or reading the acquired data (step 11), in response to a user's chromatogram data analysis instruction, the analysis mode selection unit 53 displays a screen for asking the user about an analysis mode for the chromatogram data on the display unit 7. This screen shows analysis modes such as "two-class output (classification into peak region/non-peak region)", and the user selects a desired analysis mode to determine the analysis mode. Analysis modes other than the two-class output will be described later.

When the user selects the analysis mode (step 12), the waveform division unit 54 divides a waveform (original waveform) of the chromatogram into a predetermined number of partial waveforms (partial original waveforms) (step 13). The predetermined number is determined depending on the length of the waveform (length of the time of performing the chromatograph mass spectrometry) at least such that the width (length in the time axis direction) of each partial original waveform is smaller than the width of a peak expected to be included in the chromatogram. The number of divisions may be the same as or different from the number of divisions of the training data 421 and the validation data 422. The number of divisions may also be appropriately determined from the viewpoint described above, and can be, for example, 512 or 1,024.

Subsequently, the determination unit 55 reads a learned model corresponding to the analysis mode selected by the user from the learned model storage unit 44 (step 14). Then, the partial original waveforms are input into the learned model (step 15). The learned model determines whether each of the input partial original waveforms belongs to a peak region (step 16). In this way, feature information (information on whether a partial original waveform belongs to a peak region) is added to each partial original waveform.

Upon completion of the determination of each partial original waveform by the determination unit 55, the classification unit 56 classifies the partial original waveforms depending on the feature information (information on whether a partial original waveform belongs to a peak region) based on a result of the determination (step 17).

After the classification of the partial original waveforms, the noise value calculation unit 57 calculates a noise value based on a waveform of a non-peak region (step 18). The noise value can be, for example, an average value of the intensities of partial original waveforms belonging to the non-peak region. The noise removal unit 58 subtracts the calculated noise value from the original waveform to remove noise (step 19), and displays a subtraction result on the screen of the display unit 7.

Next, an example (example of the two-class output) in which a learned model was created using actual chromatogram data and analyzed a chromatogram waveform will be described. In this example, 13,359 pieces of chromatogram data were acquired by performing chromatograph mass spectrometry on samples containing a primary metabolite from a living body, and were subjected to manual peak picking. 1,400 pieces of the chromatogram data were used as validation data. In addition, 1,400 pieces of the chromatogram data were used as test data in order to check a correctness rate of the learned model. The other pieces of the chromatogram data were used as training data. Furthermore, in the creation of the learned model, the number of times of inputting the training data and checking a correctness rate using the validation data (the above-described predetermined number of times) was set to 60, and the learning model subjected to the 60th learning was selected as the learned model.

Figure 4:
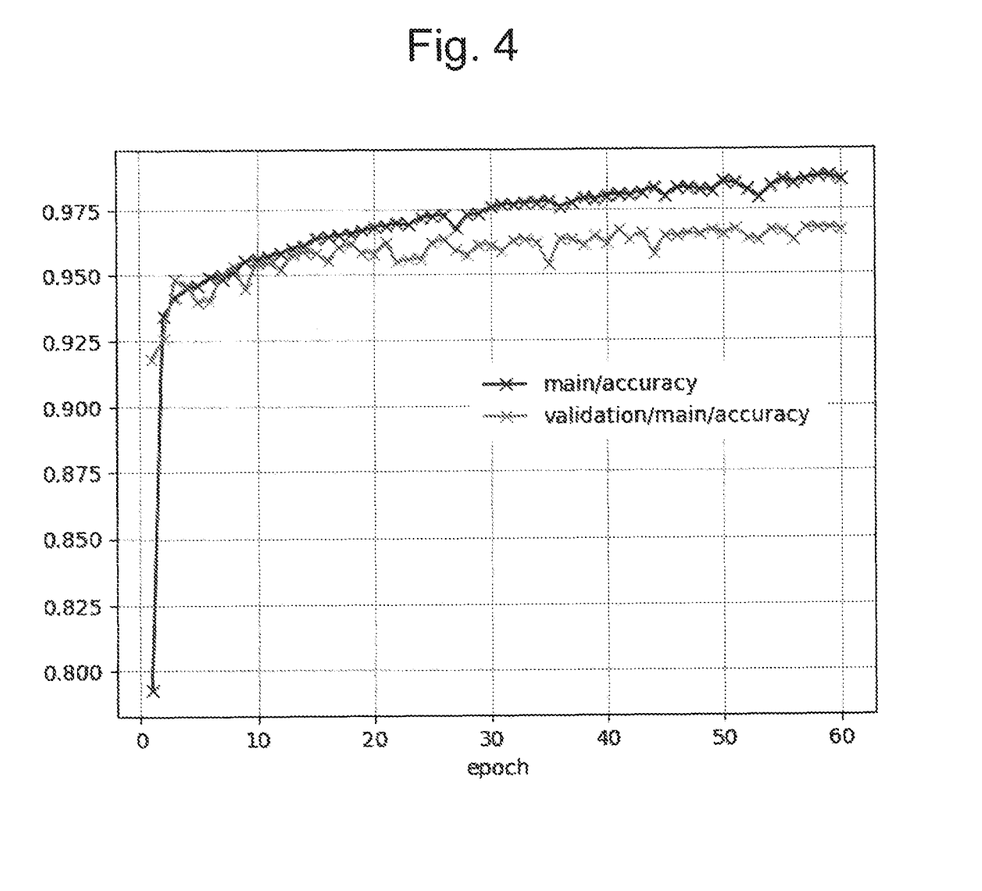
FIG. 4 is a diagram for explaining creating a learned model of two-class output using the waveform analytical device of the present embodiment.

FIG. 4 is a graph illustrating transition of correctness rates in the process of creating the learned model. In FIG. 4, "main/accuracy" indicates a correctness rate for the training data 421, and "validation/main/accuracy" indicates a correctness rate for the validation data 422. The graph shows that the correctness rates for both the training data 421 and the validation data 422 gradually improve as the number of inputs increases. This does not mean, however, that increasing the number of inputs of the training data 421 and the validation data 422 improves the correctness rates. Increasing the number of inputs too much causes a phenomenon called over-training, resulting in a decrease in the correctness rates. Therefore, it is preferable to check the transition of the correctness rates and end the input of the training data 421 and the validation data 422 before over-training occurs. When the test data was used to verify the accuracy of the two-class output of this learned model, the correctness rate was 98%.

Figure 5:
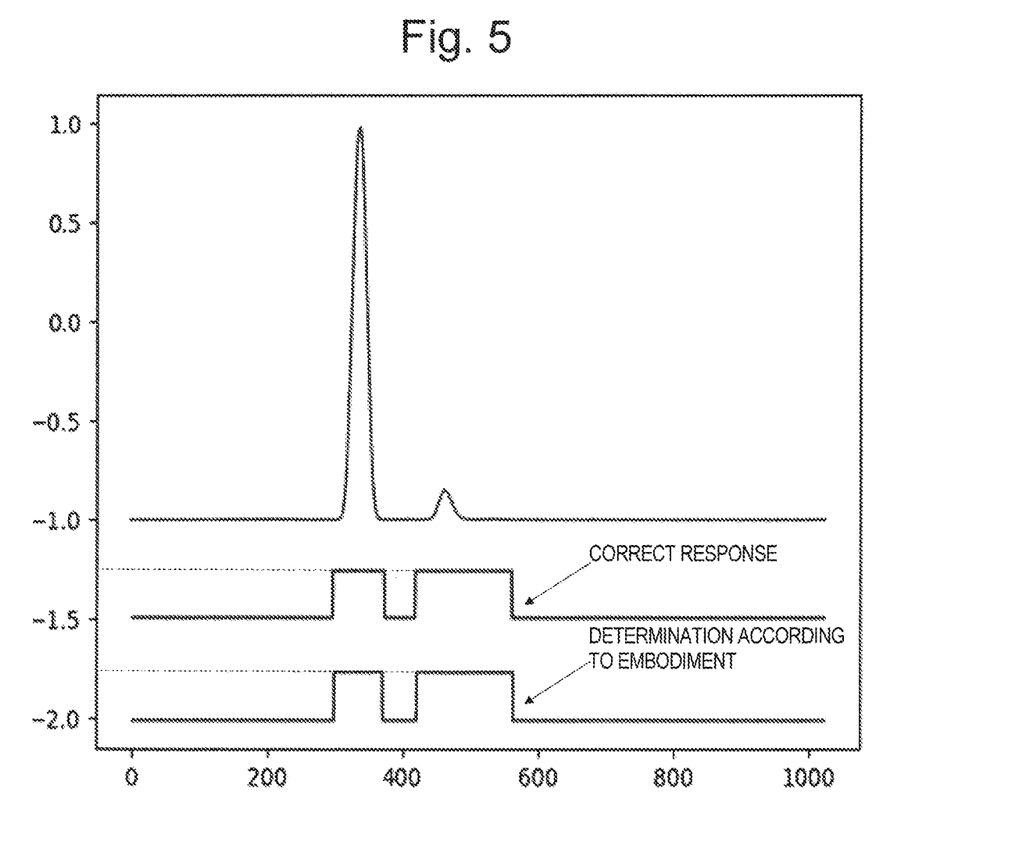
FIG. 5 is a diagram illustrating a result of analyzing a chromatogram with the two-class output using the waveform analytical device of the present embodiment.

FIG. 5 illustrates a result of analyzing the original waveform using the learned model. In FIG. 5, a correct response of the two-class output is indicated by −1.25 (peak region) and −1.5 (non-peak region), and a result of determination using the learned model is indicated by −1.75 (peak region) and −2.0 (non-peak region). The correct response and the result are shown together with the original waveform. As can be seen in FIG. 5, the peak region and the non-peak region of the original waveform of the chromatogram are correctly classified.

The above analysis mode (two-class output) is an example of the fewest classifications. Next, several preferred additional configurations allowing for analyzing a chromatogram waveform in more detail will be described. A configuration described below can be appropriately combined with the above embodiment. A plurality of additional configurations can also be combined as long as processes do not conflict with each other.

One of the preferred additional configurations is a three-class output in which a classification of a boundary of a peak is added to the two-class output. In this case, a learned model is created by machine learning using a plurality of sets of a plurality of partial waveforms created by dividing the training data 421 and the validation data 422 (hereinafter, these are collectively referred to as "reference waveforms") in which a position of a boundary of a peak is known. Then, the peak region, which is one of the feature information in the two-class output, is classified into two, a peak boundary portion and a non-peak boundary portion (the other).

In a chromatograph, a column separates components contained in a sample. However, in a case of a sample containing a large number of components, it is not necessarily possible to completely separate all the components. Hence, a peak (overlapping peak) having a plurality of peaks overlapping each other may appear on a chromatogram. The process of obtaining the concentration and content of a compound from the area and height of a peak is based on an assumption that the peak does not overlap another peak. Therefore, when a plurality of peaks overlap each other, a process of dividing the peaks is required. The above three-class output allows for easily separating the peaks when such a process is performed.

A four-class output configuration can also be adopted in which the peak boundary portion, which is one of the feature information in the three-class output configuration, is classified into two, a peak start point and a peak end point. In this case, a learned model is created by machine learning using a plurality of sets of a plurality of partial waveforms created by dividing reference waveforms in which positions of a start point and an end point of a peak are known.

There are techniques conventionally used for dividing an overlapping peak, such as tailing processing of dividing a target peak into two peaks such that a first peak is defined between a start point and an end point of the target peak and superimposing a second peak on the first peak forms the target peak, complete separation of separating two peaks by sequentially connecting the start point, a minimum point, and the end point of the target peak, and vertical division of separating two peaks by a perpendicular line passing through the minimum point of the target peak. For example, Patent Literature 1 describes software capable of automatically performing peak picking when an analyst selects any of tailing processing, complete separation, and vertical division and inputs required parameters. Alternatively, peaks may be separated by fitting using a model function such as a Gaussian function.

In tailing processing described above, where the two peaks have respective start points and end points, a first peak start point and a second peak start point exist in order, and subsequently an end point of the first peak and the second peak exists from a shorter retention time side. On the other hand, in complete separation and vertical division, the first peak start point and the first peak end point, and subsequently the second peak start point and the second peak end point exist from the shorter retention time side. In the four-class output configuration, the peak boundary portion is distinguished into a peak start point and a peak end point, allowing the user to check an arrangement of the peak start point and the peak end point and then to examine an appropriate peak division technique.

Furthermore, a configuration can also be adopted in which the peak region, which is one of the feature information, is classified into an overlapping peak region and a single peak region. In this case, it is only necessary to create a learned model by machine learning using a plurality of sets of a plurality of partial waveforms created by dividing reference waveforms including a single peak and an overlapping peak having a plurality of peaks overlapping each other, in which positions of the single peak and the overlapping peak are known. Adopting this configuration allows the user to easily discriminate a region requiring peak separation.

Furthermore, a five-class output configuration can also be adopted in which the overlapping peak region in the above configuration is classified into three, vertical division, complete separation, and tailing processing. In this case, it is only necessary to create a learned model by machine learning using a plurality of sets of a plurality of partial waveforms created by dividing reference waveforms including an overlapping peak whose peaks are separated by each of tailing processing, complete separation, and vertical division.

Which technique is suitable for dividing (separating) an overlapping peak included in a chromatogram to be analyzed varies depending on the shape of baseline drift, the shape of the peak, etc., included in the chromatogram, and is likely to be subjectively determined by the user. In the five-class output configuration, a technique suitable for dividing the overlapping peak can be automatically determined using the learned model, allowing for dividing the peak objectively and accurately without subjectivity of the user.

Figure 6:
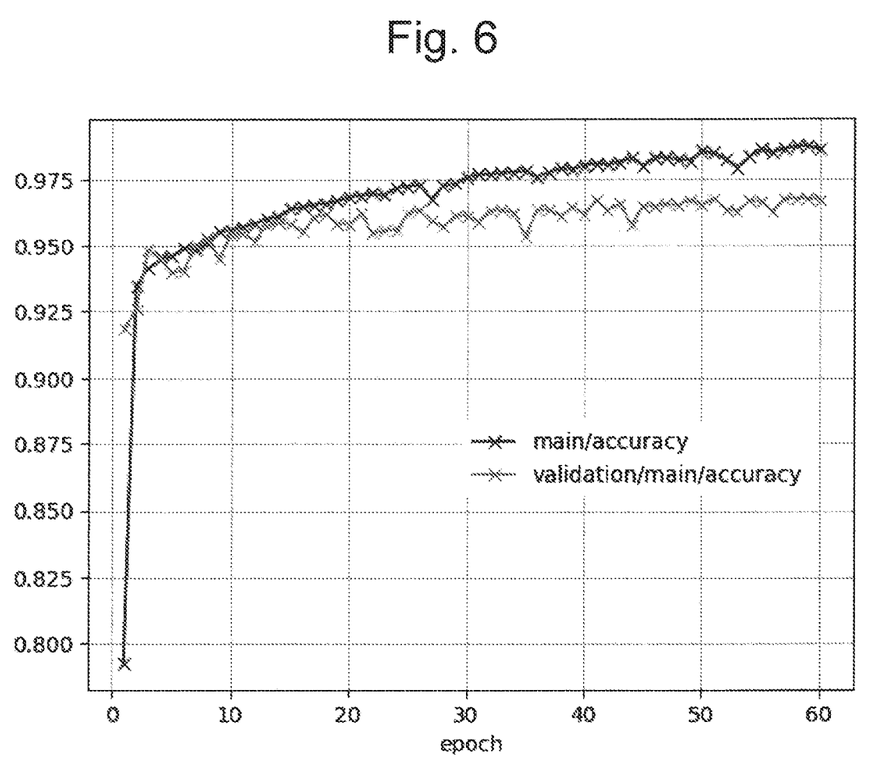
FIG. 6 is a diagram for explaining creating a learned model of five-class output using the waveform analytical device of the present embodiment.

FIG. 6 illustrates an example in which a learned model used for the analysis mode (five-class output) was created. As in FIG. 4 which shows the example of the two-class output, "main/accuracy" indicates a correctness rate for the training data 421, and "validation/main/accuracy" indicates a correctness rate for the validation data 422 in FIG. 6. Similarly to FIG. 4, in this example, the correctness rates for both the training data 421 and the validation data 422 gradually improve as the number of inputs increases. When the test data was used to verify the accuracy of the five-class output of this learned model, the correctness rate was 97%.

Figure 7:
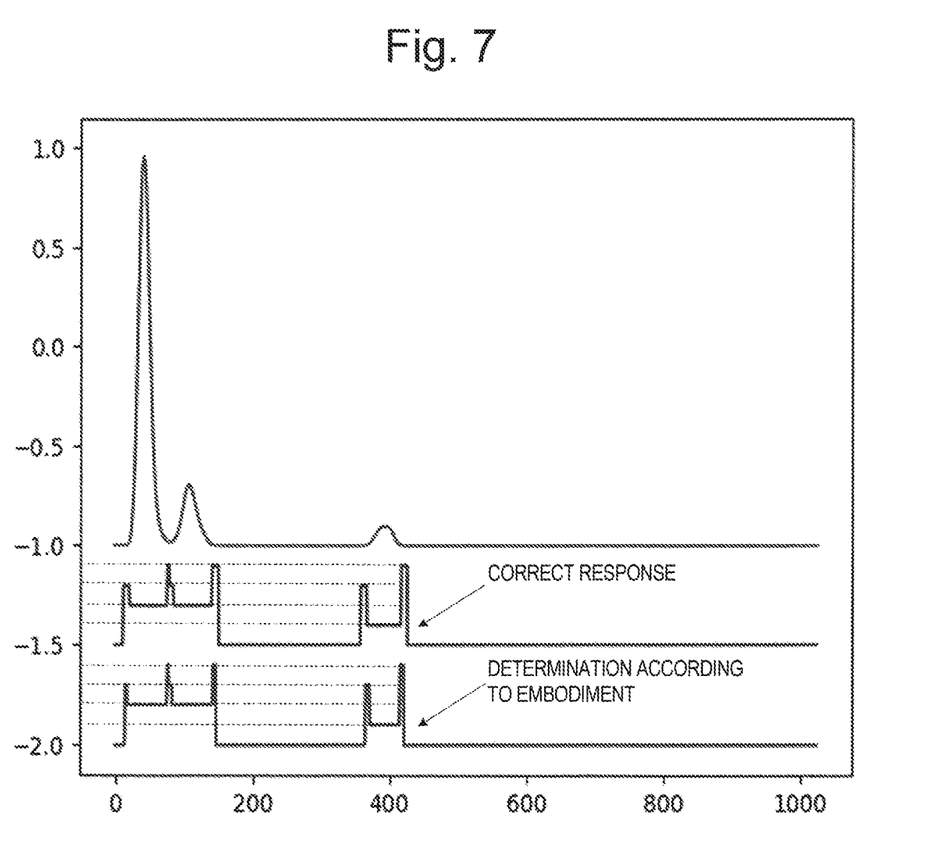
FIG. 7 is a diagram illustrating a result of analyzing a chromatogram with the five-class output using the waveform analytical device of the present embodiment.

FIG. 7 illustrates a diagram illustrating a result of analyzing an original waveform of a chromatogram with the five-class output. In FIG. 7, a correct response of the five-class output is indicated by −1.1 (peak end point), −1.2 (peak start point), −1.3 (vertical division peak), −1.4 (single peak), and −1.5 (non-peak region), and an output by the learned model is indicated by −1.6 (peak end point), −1.7 (peak start point), −1.8 (vertical division peak), −1.9 (single peak), and −2.0 (non-peak region). The correct response and the output are shown together with the original waveform. As can be seen in FIG. 7, partial waveforms of the chromatogram are correctly classified.

In the configuration of classification into an overlapping peak and a single peak, peaks can also be separated by fitting (for example, Gaussian fitting or Exponential Modified Gaussian (EMG) fitting) using a predetermined model function. In this case, the storage unit 41 stores the model function to be used in advance. In addition, the peak separation unit 59, which performs fitting using the predetermined model function to separate the peaks, is used for a portion determined to be the overlapping peak region according to the learned model.

In the configuration of classification into an overlapping peak and a single peak, classification depending on the number of peaks included in an overlapping peak can be further added. In this case, it is only necessary to create a learned model by machine learning using a plurality of sets of a plurality of partial waveforms created by dividing reference waveforms including a plurality of overlapping peaks each having a different number of peaks overlapping each other. This allows the user to easily grasp the number of peaks included in an overlapping peak.

The above preferred embodiments are obtained mainly by adding classifications related to peak separation. However, a function of estimating a baseline included in a chromatogram may be added. In this case, the baseline estimation unit 60, which estimates a baseline based on partial waveforms determined to be the non-peak region, is used. The baseline estimation unit 60 estimates a baseline of an entire target waveform by fitting the partial waveforms of the non-peak region to a model function or the like. This can help, for example, examine which of vertical division, complete separation, and tailing processing is suitable for separating an overlapping peak. In the configuration of classification of an overlapping peak according to a learned model, the user can easily check the appropriateness of a result of the classification according to the learned model.

In addition, the functional blocks in the control/processing unit 4 of the chromatograph mass spectrometer of the above embodiment may additionally include a peak area value calculation unit that calculates the area of a peak region after an original waveform is classified by the learned model (or a peak height calculation unit that calculates the height of the peak). This allows for easily quantifying a component corresponding to the peak.

Each of the above embodiments is an example, and can be appropriately changed in accordance with the gist of the present invention. In the above embodiment, the waveform analytical device is incorporated as a part of the chromatograph mass spectrometry system, but can be independent of the chromatograph mass spectrometer. In this case, the waveform analytical device may read and analyze chromatogram data acquired in advance by the chromatograph mass spectrometer. In the above embodiment, the case of processing a waveform of a chromatogram obtained by the chromatograph mass spectrometry has been described as an example. However, a chromatogram acquired by a chromatograph having a detector (spectrophotometer) other than the mass spectrometer or a gas chromatograph can also be analyzed in the same way. Furthermore, an object to be analyzed is not limited to a chromatogram. For example, an optical spectrum (a waveform representing changes in detection intensity with respect to a wavelength or wavenumber axis) acquired by spectrophotometer measurement can also be analyzed in the same way as described above.

[Modes]

It is understood by those skilled in the art that the plurality of exemplary embodiments described above are specific examples of the following aspects.

(Clause 1)

A waveform analytical method according to an aspect of the present invention is a waveform analytical method for analyzing a target waveform which is a chromatogram or an optical spectrum, the waveform analytical method including steps of:

creating, by machine learning using a plurality of sets of a plurality of partial waveforms created by dividing a reference waveform having a peak portion whose position is known, a learned model which specifies a peak portion included in an input waveform;

dividing the target waveform into a plurality of partial waveforms;

determining whether each of the plurality of partial waveforms of the target waveform is a peak portion using the learned model; and classifying the target waveform into a peak region where the peak portion continues and a non-peak region other than the peak region based on a result of the determining.

(Clause 10)

A waveform analytical device according to another aspect of the present invention is a waveform analytical device which analyzes a target waveform which is a chromatogram or optical spectrum, the waveform analytical device including:

a waveform division unit configured to divide the target waveform into a plurality of partial waveforms;

a determination unit configured to determine whether each of the plurality of partial waveforms of the target waveform is a peak portion using a learned model created by machine learning using a plurality of sets of a plurality of partial waveforms created by dividing a reference waveform having a peak portion whose position is known; and a classification unit configured to classify the target waveform into a peak region where the peak portion continues and a non-peak region other than the peak region based on a determination result from the determination unit.

In the waveform analytical method according to clause 1 and the waveform analytical device according to clause 10, a learned model for determining whether an input waveform is a peak portion is created in advance by machine learning using a plurality of sets of a plurality of partial waveforms created by dividing a reference waveform having a peak portion whose position is known. Here, the reference waveform used to create the learned model is typically a waveform obtained by the same type of measurement as the target waveform (chromatogram or optical spectrum), but a waveform created by theoretical calculation or the like is also available. The plurality of partial waveforms of the reference waveform are created by dividing the reference waveform at intervals narrower than the peak width of a peak included in the reference waveform. In this way, the learned model is created in which various shapes of the partial waveforms constituting a part of the peak are learned. Afterwards, as in the case of dividing the reference waveform, the target waveform is divided at intervals narrower than the peak width of a peak expected to be included in the target waveform to create partial waveforms. Then, the above-described learned model is used to determine whether each of the plurality of partial waveforms obtained by dividing the target waveform is a peak portion whose position is unknown in the target waveform. This results in classifying the plurality of partial waveforms of the target waveform into the peak portion and a non-peak portion. Based on the classification, a region where the peak portion continues is classified as a peak region, and a region where the non-peak portion continues is classified as a non-peak region. In the waveform analytical method and the waveform analytical device according to the present invention, the target waveform is classified into the peak region and the non-peak region by using the learned model in which the features of a plurality of reference waveforms are learned, allowing for performing peak picking with high accuracy without complicated operations.

(Clause 2)

In the waveform analytical method according to clause 1, the learned model is created by machine learning using a plurality of sets of a plurality of partial waveforms created by dividing a reference waveform having a peak, a position of a boundary of the peak being known, the waveform analytical method including:

specifying a boundary of a peak included in a partial waveform determined to be the peak portion, and classifying the peak region into a peak boundary portion and a non-peak boundary portion.

(Clause 11)

In the waveform analytical device according to clause 10, the learned model is created by machine learning using a plurality of sets of a plurality of partial waveforms created by dividing a reference waveform having a peak, a position of a boundary of the peak being known, the determination unit is configured to specify a boundary of a peak included in a partial waveform determined to be the peak portion, and the classification unit is configured to classify the peak region further into a peak boundary portion and a non-peak boundary portion.

The waveform analytical method according to clause 2 and the waveform analytical device according to clause 11 allow for easily separating an overlapping peak when quantifying sample components and the like.

(Clause 3)

In the waveform analytical method according to clause 2, the learned model is created by machine learning using a plurality of sets of a plurality of partial waveforms created by dividing a reference waveform having a peak, positions of a start point and an end point of the peak being known, the waveform analytical method including:

determining whether the boundary of the peak is a start point or an end point of the peak, and classifying the peak boundary portion into a peak start point and a peak end point.

(Clause 12)

In the waveform analytical device according to clause 11, the learned model is created by machine learning using a plurality of sets of a plurality of partial waveforms created by dividing a reference waveform having a peak, positions of a start point and an end point of the peak being known, the determination unit is configured to determine whether the boundary of the peak is a start point or an end point of the peak, and the classification unit is configured to classify the boundary of the peak further into a peak start point and a peak end point.

In the waveform analytical method according to clause 3 and the waveform analytical device according to clause 12, the peak boundary portion is distinguished into a peak start point and a peak end point, allowing the user to check an arrangement of the peak start point and the peak end point and then to examine an appropriate peak division technique.

(Clause 4)

In the waveform analytical method according to any one of clauses 1 to 3, the learned model is created by machine learning using a plurality of sets of a plurality of partial waveforms created by dividing a reference waveform including a single peak and an overlapping peak having a plurality of peaks overlapping each other, positions of the single peak and the overlapping peak being known, the waveform analytical method including:

determining whether a peak included in the peak region where the peak portion continues is a single peak or an overlapping peak; and classifying the peak region further into a single peak region and an overlapping peak region.

(Clause 13)

In the waveform analytical device according to any one of clauses 10 to 12, the learned model is created by machine learning using a plurality of sets of a plurality of partial waveforms created by dividing a reference waveform including a single peak and an overlapping peak having a plurality of peaks overlapping each other, positions of the single peak and the overlapping peak being known, the determination unit is configured to determine whether a peak included in the peak region where the peak portion continues is a single peak or an overlapping peak, and the classification unit is configured to classify the peak region further into a single peak region and an overlapping peak region.

The waveform analytical method according to clause 4 and the waveform analytical device according to clause 13 allow the user to easily discriminate a region requiring peak separation.

(Clause 5)

In the waveform analytical method according to clause 4, the learned model is created by machine learning using a plurality of sets of a plurality of partial waveforms created by dividing a reference waveform including an overlapping peak whose peaks are separated by each of techniques including tailing processing of separating a first peak having a region defined between a start point and an end point of the overlapping peak and a second peak such that superimposing the second peak on the first peak forms the overlapping peak, complete separation of separating peaks by a line sequentially connecting the start point, a minimum point, and the end point of the overlapping peak, and vertical division of separating two peaks by a perpendicular line passing through the minimum point of the overlapping peak, the waveform analytical method including determining a suitable technique for separating the plurality of peaks included in the overlapping peak region.

(Clause 14)

In the waveform analytical device according to clause 13, the learned model is created by machine learning using a plurality of sets of a plurality of partial waveforms created by dividing a reference waveform including an overlapping peak whose peaks are separated by each of techniques including tailing processing of separating a first peak having a region defined between a start point and an end point of the overlapping peak and a second peak such that superimposing the second peak on the first peak forms the overlapping peak, complete separation of separating peaks by a line sequentially connecting the start point, a minimum point, and the end point of the overlapping peak, and vertical division of separating two peaks by a perpendicular line passing through the minimum point of the overlapping peak, and the determination unit is configured to determine a suitable technique for separating the plurality of peaks included in the overlapping peak region.

In the waveform analytical method according to clause 5 and the waveform analytical device according to clause 14, a technique suitable for dividing the overlapping peak can be automatically determined using the learned model, allowing for dividing the peak objectively and accurately without subjectivity of the user.

(Clause 6)

The waveform analytical method according to clause 4, includes separating the plurality of peaks included in the overlapping peak region using a predetermined model function.

(Clause 7)

In the waveform analytical method according to clause 6, the plurality of peaks included in the overlapping peak region are separated by Gaussian fitting or Exponential Modified Gaussian fitting.

(Clause 15)

The waveform analytical device according to clause 13, further includes a peak separation unit configured to separate the plurality of peaks included in the overlapping peak region using a predetermined model function.

(Clause 16)

In the waveform analytical device according to clause 15, the peak separation unit is configured to separate a peak by Gaussian fitting or Exponential Modified Gaussian fitting.

In the waveform analytical method according to clause 6 or 7 and the waveform analytical device according to clause 15 or 16, the model function allows for automatically separating the overlapping peak.

(Clause 8)

The waveform analytical method according to any one of clauses 1 to 7, includes obtaining a noise value based on the target waveform classified into the non-peak region.

(Clause 17)

The waveform analytical device according to any one of clauses 10 to 16, further includes a noise value calculation unit configured to obtain a noise value based on the target waveform classified into the non-peak region.

The waveform analytical method according to clause 8 and the waveform analytical device according to clause 17 allow for automatically calculating the noise value included in the target waveform.

(Clause 9)

The waveform analytical method according to any one of clauses 1 to 8, includes estimating a baseline based on the target waveform classified into the non-peak region.

(Clause 18)

The waveform analytical device according to any one of clauses 10 to 17, further includes a baseline estimation unit configured to estimate a baseline based on the target waveform classified into the non-peak region.

The waveform analytical method according to clause 9 and the waveform analytical device according to clause 18 can help, for example, examine which of vertical division, complete separation, and tailing processing is suitable for separating an overlapping peak. In the configuration of classification of an overlapping peak region according to a learned model, the user can easily check the appropriateness of a result of the classification according to the learned model.

REFERENCE SIGNS LIST

1 . . . Liquid Chromatograph
2 . . . Mass Spectrometer
4 . . . Control/Processing Unit
41 . . . Storage Unit
42 . . . Reference Waveform Storage Unit
421 . . . Training Data
422 . . . Validation Data
43 . . . Measurement Data Storage Unit
44 . . . Model Storage Unit
51 . . . Measurement Control Unit
52 . . . Model Creation Unit
53 . . . Analysis Mode Selection Unit
54 . . . Waveform Division Unit
55 . . . Determination Unit
56 . . . Classification Unit
57 . . . Noise Value Calculation Unit
58 . . . Noise Removal Unit
59 . . . Peak Separation Unit
60 . . . Baseline Estimation Unit
6 . . . Input Unit
7 . . . Display Unit

The invention claimed is:

1. A waveform analytical method for analyzing a target waveform which is a chromatogram or an optical spectrum, the method comprising:

creating, by machine learning using sets of partial waveforms created by dividing a reference waveform including a single nonoverlapping peak and overlapping peaks having peaks overlapping each other, positions of the single nonoverlapping peak and the overlapping peaks being known, a learned model which specifies a peak portion included in an input waveform;

dividing the target waveform into partial waveforms;

determining whether each of the partial waveforms of the target waveform is a peak portion using the learned model;

classifying the target waveform into a peak region where the peak portion continues and a non-peak region other than the peak region based on a result of the determining, determining whether a peak included in the peak region where the peak portion continues is a single nonoverlapping peak or overlapping peaks;

classifying the peak region further into a single nonoverlapping peak region and an overlapping peak region; and identifying a component contained in a sample corresponding to a peak in the target waveform, based on the peak region and the non-peak region classified.

2. The waveform analytical method according to claim 1, wherein the learned model is created by machine learning using sets of partial waveforms created by dividing a reference waveform having a peak, a position of a boundary of the peak being known, the waveform analytical method comprising:

specifying a boundary of a peak included in a partial waveform determined to be the peak portion, and classifying the peak region into a peak boundary portion and a non-peak boundary portion.

3. The waveform analytical method according to claim 2, wherein the learned model is created by machine learning using sets of partial waveforms created by dividing a reference waveform having a peak, positions of a start point and an end point of the peak being known, the waveform analytical method comprising:

determining whether the boundary of the peak is a start point or an end point of the peak, and classifying the peak boundary portion further into a peak start point and a peak end point.

4. The waveform analytical method according to claim 1, wherein the learned model is created by machine learning using sets of partial waveforms created by dividing a reference waveform including overlapping peaks whose peaks are separated by each of techniques including tailing processing of separating a first peak having a region defined between a start point and an end point of the overlapping peaks and a second peak such that superimposing the second peak on the first peak forms the overlapping peaks, complete separation of separating peaks by a line sequentially connecting the start point, a minimum point, and the end point of the overlapping peaks, and vertical division of separating two peaks by a perpendicular line passing through the minimum point of the overlapping peaks, the waveform analytical method comprising determining a suitable technique for separating the peaks included in the overlapping peak region.

5. The waveform analytical method according to claim 1, comprising separating the peaks included in the overlapping peak region using a predetermined model function.

6. The waveform analytical method according to claim 5, wherein the peaks included in the overlapping peak region are separated by Gaussian fitting or Exponential Modified Gaussian fitting.

7. The waveform analytical method according to claim 1, comprising obtaining a noise value based on the target waveform classified into the non-peak region.

8. The waveform analytical method according to claim 1, comprising estimating a baseline based on the target waveform classified into the non-peak region.

9. A waveform analytical device which analyzes a target waveform which is a chromatogram or an optical spectrum, the waveform analytical device comprising:
a waveform division unit configured to divide the target waveform into partial waveforms;
a determination unit configured to determine whether each of the partial waveforms of the target waveform is a peak portion using a learned model created by machine learning using sets of a plurality of partial waveforms created by dividing a reference waveform including a single nonoverlapping peak and overlapping peaks having peaks overlapping each other, positions of the single nonoverlapping peak and the overlapping peaks being known known; and
a classification unit configured to
classify the target waveform into a peak region where the peak portion continues and a non-peak region other than the peak region based on a determination result from the determination unit, and
identify a component contained in a sample corresponding to a peak in the target waveform, based on the peak region and the non-peak region classified, wherein
the determination unit is further configured to determine whether a peak included in the peak region where the peak portion continues is a single nonoverlapping peak or an overlapping peak, and
the classification unit is further configured to classify the peak region further into a single nonoverlapping peak region and an overlapping peak region.

10. The waveform analytical device according to claim 9, wherein
the learned model is created by machine learning using sets of partial waveforms created by dividing a reference waveform having a peak, a position of a boundary of the peak being known,
the determination unit is configured to specify a boundary of a peak included in a partial waveform determined to be the peak portion, and the classification unit is configured to classify the peak region further into a peak boundary portion and a non-peak boundary portion.

11. The waveform analytical device according to claim 10, wherein
the learned model is created by machine learning using sets of partial waveforms created by dividing a reference waveform having a peak, positions of a start point and an end point of the peak being known,
the determination unit is configured to determine whether the boundary of the peak is a start point or an end point of the peak, and
the classification unit is configured to classify the boundary of the peak further into a peak start point and a peak end point.

12. The waveform analytical device according to claim 9, wherein
the learned model is created by machine learning using sets of partial waveforms created by dividing a reference waveform including overlapping peaks whose peaks are separated by each of techniques including tailing processing of separating a first peak having a region defined between a start point and an end point of the overlapping peaks and a second peak such that superimposing the second peak on the first peak forms the overlapping peaks, complete separation of separating peaks by a line sequentially connecting the start point, a minimum point, and the end point of the overlapping peaks, and vertical division of separating two peaks by a perpendicular line passing through the minimum point of the overlapping peaks, and
the determination unit is configured to determine a suitable technique for separating the peaks included in the overlapping peak region.

13. The waveform analytical device according to claim 9, further comprising
a peak separation unit configured to separate the peaks included in the overlapping peak region using a predetermined model function.

14. The waveform analytical device according to claim 13, wherein the peak separation unit is configured to separate a peak by Gaussian fitting or Exponential Modified Gaussian fitting.

15. The waveform analytical device according to claim 9, further comprising
a noise value calculation unit configured to obtain a noise value based on the target waveform classified into the non-peak region.

16. The waveform analytical device according to claim 9, further comprising
a baseline estimation unit configured to estimate a baseline based on the target waveform classified into the non-peak region.

* * * * *